United States Patent Office 3,532,513
Patented Oct. 6, 1970

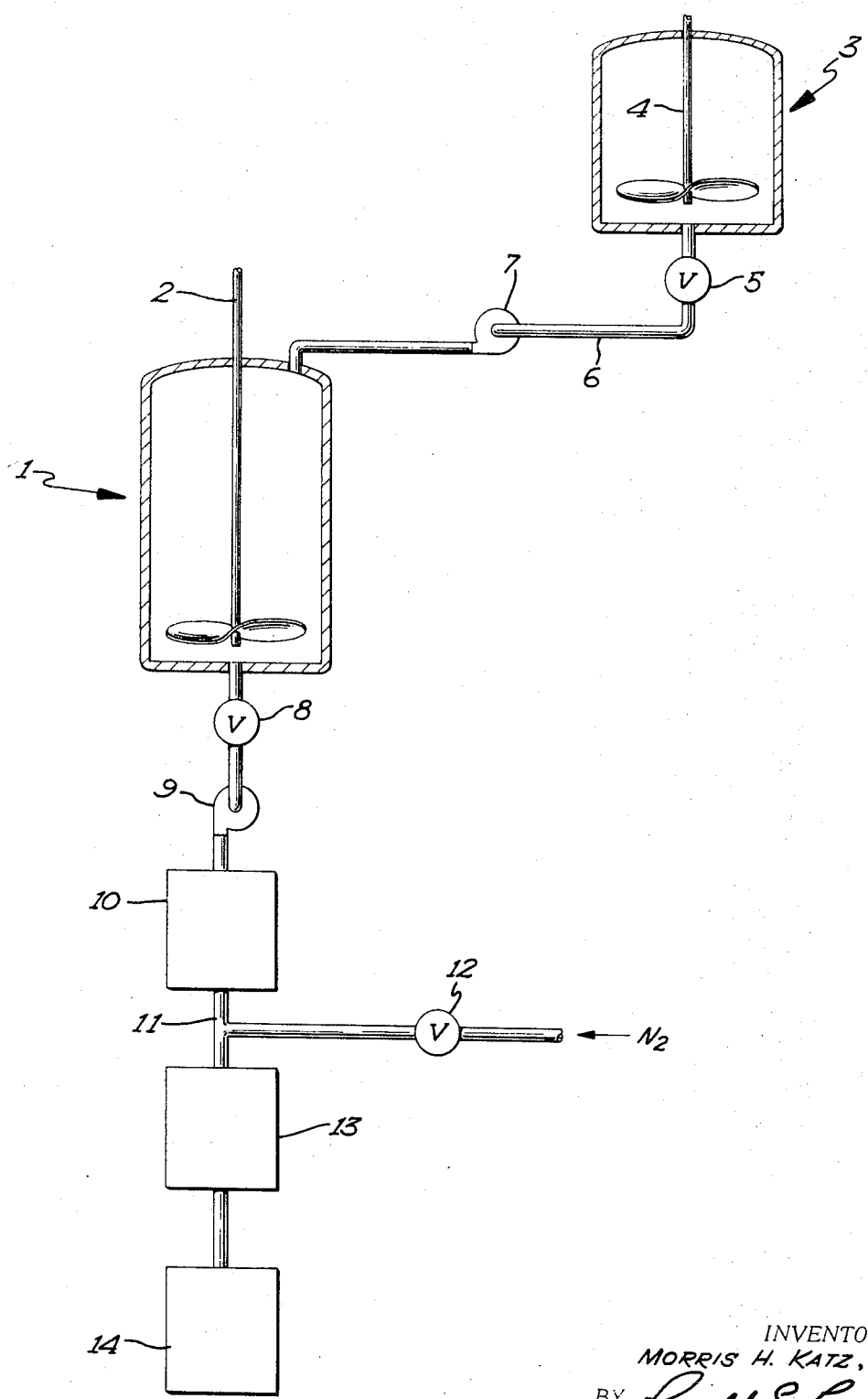

3,532,513
ICINGS CONTAINING HIGH MALTOSE CORN SYRUPS
Morris H. Katz, St. Louis Park, Minn., assignor to The Pillsbury Company, Minneapolis, Minn., a corporation of Delaware
Continuation-in-part of application Ser. No. 602,612, Dec. 19, 1966. This application Aug. 1, 1967, Ser. No. 657,560
Int. Cl. A23g *3/00*
U.S. Cl. 99—139                         10 Claims

ABSTRACT OF THE DISCLOSURE

Stable, aerated icings containing corn syrup, water, emulsified fat and sugar are provided by maintaining the total amount of monosaccharide in the icing to a level of less than one part by weight monosaccharide for each twenty parts by weight disaccharide. To provide a low level of monosaccharide, corn syrups having a disaccharide to monosaccharide ratio of at least 3:1 are employed to provide an icing of a firm, aerated structure that is stable against liquid exudation and/or absorption of moisture from the bakery product to which the icing has been applied.

---

This application is a continuation in part of copending application Ser. No. 602,612 filed Dec. 19, 1966.

This invention relates to aerated icings. More particularly, the present invention relates to aerated icings containing corn syrup, sugar and shortening.

Icings generally contain, as basic ingredients, water and sugar. Properties and characteristics of icings can be modified by the proportion of constituents and the additives used in conjunction with the water and sugar. Cream or buttercream icings contain substantial amounts of fat or shortening which permit the aeration thereof. Aerated icings are generally applied to baked goods, confections such as cakes, sweet rolls, pastries, etc.

Sucrose is conventionally employed as a cream icing sugar. In order to provide a stable icing (i.e., ability of the icing to retain its firm aerated structure) a considerable amount of sucrose must be employed in the icing. Because of the relatively high sweetening power of sucrose, the resultant sucrose containing cream icing has in general an objectionable high level of sweetness. On a solid weight basis, corn syrup is considerably less sweet than sucrose. Thus, from a sweetness viewpoint, it would be desirable to employ corn syrup as a cream icing component.

Unfortunately, it has been experienced that corn syrup cannot be incorporated into a cream icing without adversely affecting the icing stability. Such corn syrup containing icings readily absorb water under humid conditions from the surrounding atmosphere as well as from bakery products to which they are applied. Eventually, the firm, aerated structure becomes liquified. Bakery products to which such an icing has been applied tend to become soggy in the proximity of the applied icing.

It is an object of the present invention to provide aerated icings which have exceptional shelf life.

Another object is to provide an aerated icing which is stable against liquid exudation when applied to a bakery product.

An additional object of the invention is to provide an aerated icing which after application to a bakery product retains its firm, aerated foam structure without concomitant collapse and running.

The drawing is a diagrammatic illustration of suitable apparatus for preparing icings of the invention.

According to the present invention there is provided an improved aerated icing adapted for use in culinary base articles, said icing comprising a uniform admixture of:

(I) A sweetening portion having less than one part by weight monosaccharide for each 20 parts by weight disaccharide and said sweetening portion comprising: (a) 15 parts by weight of a corn syrp portion having a disaccharide to monosaccharide ratio of at least 3:1 and (b) from 40 to 80 parts by weight of a disaccharide sugar portion substantially free from sugar crystals having a crystal size greater than 50 microns;
(II) From 7 to 17 parts by weight water; and,
(III) From about 5 to 30 parts by weight emulsified fat uniformly dispersed throughout said icing in the form of minute fat globules.

Unexpectedly, it has been discovered that the icing composition of the instant invention possesses superior stability against degradation yet provides an acceptable texture, mouthfeel, sweetness level, appearance and application ease. Under hot, humid conditions over a prolonged period of time, the instant icing composition retains its firm aerated structure. The instant composition when applied upon high moisture containing bakery products (e.g., a cake having a moisture level of more than about 40 percent by weight) provides an icing that does not become syrupy when stored over prolonged peridos of time under hot and humid conditions.

In order to provide a stable product, it is essential that the monosaccharide content (e.g., dextrose, galactose, mannose, fructose, etc.) to disaccharide weight ratio in the sweetening portion be less than one part by weight monosaccharide for each 20 parts by weight disaccharide. A superior stable icing suitable for application upon a high moisture containing bakery product is provided by employing a corn syrup icing having monosaccharide in less than one part by weight for each 40 parts by weight disaccharide sugar.

Employable corn syrups are those which have a disaccharide (e.g., maltose) to monosaccharide (e.g., dextrose) ratio of at least 3:1. Pronounced stability is achieved by employing a corn syrup which has a disaccharide to monosaccharide ratio greater than 5:1. Generally, the corn syrups adaptable herein contain from about 17 to about 22 percent by weight water and have a disaccharide to monosaccharide ratio of not greater than 20:1.

Illustrative disaccharide sugars employable in the sugar portion of the sweetening portion include lactose, maltose, sucrose, trehalose and the like.

Fats employed herein are those typically employed in preparing icings. Exemplary fats are those which are normally solid at 20° C. including both the animal and vegetable fats. Illustrative fats are butter, cocoa butter, lard, hydrogenated vegetable oils (e.g., hydrogenated cottonseed, corn, coconuts, peanut, palm, safflower and soybean oils), mixtures thereof and the like. Mixtures of oils in combination with a solid fat such as tristearin which provide a fat texture and viscosity may also be employed. In general, about 5 to about 30 parts by weight fat for each 15 parts by weight corn syrup are employed. Relatively high melting fats having a Wiley melting point ranging from about 90° F. to about 145° F. enhance the mouthfeel of the resultant product. Advantageously, there is provided in the icing about 8 to about 20 parts by weight fat having a Wiley melting point ranging from about 95° F. to about 130° F. The preferred level of fat ranges from about 10 to about 15 and thus having a Wiley melting point from about 110° F. to about 125° F.

In a more limited aspect of the present invention there is provided an icing containing a firm, aerated structure wherein the gas is an edible gas which contains less than 1.5% by weight molecular oxygen and preferably less than 1.0% by weight molecular oxygen.

Although the icings herein disclosed may be prepared by numerous methods, a suitable method for preparing the icings comprises: (a) providing a hot, aqueous admixture of 15 parts by weight corn syrup, about 5 to 10 parts by weight water and from 40 to 80 parts by weight sugar; (b) cooling the hot, aqueous admixture and adding thereto from 2 to 7 parts by weight additional water; and, (c) vigorously agitating the cooled admixture with about 5 to 30 parts by weight fat in the presence of an edible gas to provide an aerated icing.

Distinct product advantages are obtained by providing a hot, aqueous admixture containing about 55 to about 66 parts by weight of a disaccharide sugar, 15 parts by weight corn syrup having a disaccharide to monosaccharide ratio of at least 5:1 in combination with about 6 to about 8 parts by weight water at a temperature ranging from about 140° F. to less than 150° F. The preferred process conditions for providing the hot, aqueous medium are about 6 to 8 parts by weight water, about 62 parts by weight comminuted disaccharide sugar at a temperature of about 142° F. to about 146° F.

The hot, aqueous admixture provides an effective manner of destroying substantially all the yeast and mold developing organisms and also permits the incorporation of a large amount of sweetening agent in the final product without developing excessively large sugar crystals therein.

After the aqueous admixture has been heated for a period of time sufficient to destroy the organisms and dissolve most of the sweetening agent therein (usually about 15 minutes), the hot, aqueous admixture is cooled to a temperature of at least about 95° F. but less than about 125° F. to provide a semisolid mass substantially free from crystals greater than 50 microns in size. Cooling of the hot, aqueous admixture provides the formation of micro-fine sugar crystals. Preferably, the hot, aqueous admixture is cooled to a temperature ranging from about 105° F. to about 120° F.

There is then added to this semi-solid mass (maintained at least at about 95° F. to about 125° F.) an additional amount of microbiologically acceptable water (e.g., drinking water). The amount of added water is at least 2 parts by weight but less than 7 parts by weight per 15 parts by weight corn syrup. Advantageously, from 3 to 5 parts by weight water is added to a cooled, aqueous admixture maintained at about 105° F. to about 115° F. with about 4 parts by weight being preferred. The water added in this stage of processing is thoroughly admixed so that a homogeneous mass is obtained.

The second addition of water after cooling of the hot, aqueous admixture provides the proper moisture level for the resultant frosting product while maintaining the sugar in the microcrystalline form, thus, providing the desired texture and mouthfeel in the ultimate whipped icing.

Whipping and foam stability are enhanced by incorporation either in the heated, aqueous admixture or in the added water step (hereinbefore described) of a hydrophilic surface active agent in an amount ranging from about 0.05 up to 2.0 parts by weight per 15 parts by weight corn syrup. Hydrophilic surface active agents include polyoxyethylene (20) sorbitan monolaurate, polyoxyethylene (20) sorbitan trioleate, hydroxylated lecithin, salts of fatty acids (e.g., sodium stearate), lecithin, polyoxyethylene lauryl ether, polyoxyethylene oleate, polyoxyethylene stearate, polyoxyethylene palmitate, polyoxyethylene sorbitan tristearate, polyoxyethylene monostearate, polyoxyethylene mannitan monolaurate, polyoxyethylene sorbitan oleate laurate, polyoxyethylene ether alcohol and mixtures thereof. The preferred edible hydrophilic surface active agent is polyoxyethylene (20) sorbitan monostearate.

Other water-dispersible icing additives such as lemon, lime, coconut, butterscotch, cocoa and vanilla flavoring agent, salt, coloring agents, stabilizers, preservatives, and the like are preferably added along with the additional water although such additives may be previously provided in the heated, aqueous admixture. Similarly, artificial sweetening agents such as cyclohexylsulfamic acid, saccharine and the edible metal salts thereof (e.g., calcium and sodium) may be employed to impart additional sweetness to the icing.

The semisolid mass containing the added water is vigorously agitated with a shortening product that is substantially free from molecular oxygen at a temperature of less than 90° F. to provide an aerated icing.

It has been found that shortening products or fats obtained from commercial processors are generally contaminated with molecular oxygen in amounts sufficient to have an adverse effect upon the stability of the resultant icing (i.e., oxidative degradation). Removal of molecular oxygen from shortenings can be conveniently accomplished by melting the shortening and purging the melted shortening. During subsequent processing steps, further contamination with molecular oxygen should be avoided.

The fat may be added at any time prior to the aeration step. For example, the fat can be added to the hot, aqueous medium, along with the added water or after the additional water step. Preferably, it is added after the additional water step.

An edible lipophilic emulsifier is necessary in the instant whipped icings in order to disperse the fat throughout the cooled, aqueous admixture and provide the icings of the present invention. Exemplary edible lipophilic emulsifiers are sorbitan monostearate, sorbitan monolaurate, sorbitan monopalmitate, sorbitan tristearate, sorbitan monooleate, sorbitan trioleate, sorbitan sesquioleate, glycerol sorbitan laurate, glycerol mannitan laurate, glyceryl-lacto esters of fatty acids (e.g., the lacto-oleate, lacto-palmitate, lacto-stearate), oxystearin, monoglyceryl citrate, sucrose monostearate, lecithin, propylene glycol mono- and diesters of fats and fatty acids, mono- and diglycerides of edible fatty acids, mixtures thereof and the like. Glycerol monostearate is the preferred lipophilic emulsifier. An amount of lipophilic emulsifier of at least 1 to about 10 percent by weight of the fat will provide the necessary emulsifying effect for preparing the whipped icings herein. The preferred amount of lipophilic emulsifier is about 3 percent by weight of the fat.

Although the lipophilic emulsifier can be added to any stage of the process before the icing is whipped, it is preferably admixed with the fat prior to its admixture with the cooled, semisolid mass.

The fat product and semi-solid masses containing the added water is vigorously agitated in the presence of a gas preferably under process conditions substantially free from molecular oxygen. Vigorous agitation therein is conducted at a temperature less than 90° F. and usually above about 70° F. with a range of about 75° F. to about 85° F. being the preferred. Vigorous agitation in the presence of an elible gas whips the product into an aerated icing. The vigorous agitation step can be conducted after cooling the product to less than 90° F. or may be conducted simultaneously under rapid cooling conditions such as provided by a scraped surface heat exchanger.

The whipped or aerated icings are then advantageously packaged into a suitable container under conditions substantially free from molecular oxygen, molds and yeast (e.g., the employment of ultraviolet light).

With reference to the drawing, a suitable method for preparing a preferred icing comprises adding 21 pounds of water into mixing vessel 1. Mixing vessel 1 is provided with a mixing agitator 2, a surface scraper to prevent scorching of the sugar (not shown) and a thermally controlled heating and cooling means (not shown). The water in vessel 1 is heated to 144° F. whereupon 45 pounds of corn syrup is added thereto while maintaining moderate agitation. After the corn syrup has dissolved into the 144° F. water, 185 pounds of comminuted (10XXX) sugar is added thereto. The aqueous mixture containing the corn syrup and sugar is stirred moderately for 15 minutes at 144° F.

The contents of mixing vessel 1 are then purged with nitrogen gas by conventional means and the contents are cooled from 144° F. to 110° F. while maintaining moderate agitation and continual purging thereof. After cooling 9 pounds of microbiologically acceptable water at 110° F. containing 1 pound of artificial vanilla flavor and 0.5 pound of polyoxyethylene (20) sorbitan monostearate is added to mixing vessel 1. The added water and contents of mixing vessel 1 are then moderately pany, equipped with a thermally controlled heating jacket and a mechanical agitator with plastic scraper blades to prevent charring or scorching of the aqueous admixture.

Fat vessel 3.—An 80-gallon stainless steel pressure tank provided with a thermally controlled water jacket, mechanical stirrer and plastic scraper blade.

Scraped surface heat exchanger 13.—Two stainless steel, 6-inch by 48-inch scraped surface heat exchangers, manufactured by Cherry-Burrel Corporation, connected in series adapted to receive 25 pounds per minute.

The filler was a "Vari-Visco Cadet," manufactured by Karl Kiefer Div., Cherry-Burrel Corporation. The resultant aerated icings were packaged in a sanitary tin can.

Employing the aforementioned apparatus, the following ingredients and operating conditions were employed in preparing aerated icings:

| Apparatus | Ingredients | Pounds | Conditions |
|---|---|---|---|
| Mixing vessel 1 | Initial: | | |
| | Water | 21 | At 144° F. and mixed for 15 minutes. |
| | Corn syrup [1] | 45 | |
| | Powered sugar | 185 | |
| | Subsequent addition: | | |
| | Drinking water | 9 | At 110° F. and mixed for 15 minutes. |
| | Vanilla | 1 | |
| | Polyoxyethylene (20) sorbitan monstearate | 0.5 | |
| | Salt | 2.0 | |
| | Preservative and coloring agent | 0.5 | |
| Shortening vessel | Hydrogenated vegetable oil having a Wiley melting point of 114° F. and an iodine value of 30 to 35. | 37.5 | At 140° F., purged and agitated for 30 minutes. |

[1] 43° Baumé corn syrup having a dextrose equivalent of 48.5, a solid content of 80 weight percent containing 51.9% maltose and 9.1% dextrose (i.e., a disaccharide to monosaccharide ratio of 5.7.:1).

agitated with mixing vessel agitator 2 for 15 minutes while purging the contents thereof with nitrogen (e.g., at a rate of 8 cubic feet per hour).

During preparation and processing of the aqueous admixture, a shortening product substantially free from molecular oxygen is prepared in fat vessel 3. Fat vessel 3 is provided with a nitrogen purging means similar to that employed in mixing vessel 1 and a fat vessel stirrer 4. In fat vessel 3, 37.5 pounds of hydrogenated vegetable shortening containing 3.0 weight percent glyceryl monostearate is added. The fat product is heated to 140° F. and moderately agitated and purged with nitrogen. Fat valve 5 is then positioned to permit the contents thereof to be pumped through fat conduit 6 by means of pump 7 into mixing vessel 1.

The aqueous medium (at 110° F.) containing sugar, vanilla flavor, corn syrup and shortening is homogeneously mixed in mixing vessel 1 while purging the contents thereof with nitrogen. Mixing vessel valve 8 is opened and pump 9 is then engaged whereupon the contents pass through deaerator 10 through pipe 11 which is suitably provided with a nitrogen inlet valve 12. A suitable gas such as nitrogen, carbon dioxide, etc., is fed into the pipe 11 at a rate sufficient to reduce the specific gravity of the resultant aerated icing to about 1.00. The nitrogen containing product is then passed through a scraped surface heat exchanger 13 which simultaneously whips and cools the product to 85° F. The resultant icing product issuing from heat exchanger 13 is then conveyed to a conventional filler 14 and packaged such that the gas in the headspace contains less than 3 percent oxygen by volume.

The following examples are illustrative of the invention:

EXAMPLE I

An icing preparation

Employing the apparatus disclosed in the drawing and described hereinbefore, an aerated vanilla icing containing a high maltose corn syrup was prepared. The apparatus employed was as follows:

Mixing vessel 1.—A 50-gallon stainless steel pressure vessel, manufactured by Groen Manufacturing Com- The resultant aerated frosting had a specific gravity of 1.03 and possessed a smooth, creamy mouthfeel without a concomitant stringy, greasy texture. The product was not gritty (i.e., contained no large sugar crystals). Total amount of molecular oxygen contained in the aerated icing was less than 1% by total gas weight thereof. As packaged, the product was stable, when stored at 100° F. for at least 6 months, against syneresis with no detectable microbial degradation. Substantially no change in specific gravity was observed when the product was stored for at least 1 year at 75° F., thus indicating the aerated frosting was stable against deaeration. Stability of the product against rancidity due to oxidative degradation was exhibited by no detectable rancidity when the packaged product was stored at least 6 months at 100° F. and at least 1 year at 75° F. The aerated product had a superior flavor. No syneresis or product degradation was observed when the product was subjected to a freeze-thaw test which consisted of freezing the product at 0° F. for 2 days and thawing the product at 75 F. for 2 days and repeating the test for 5 times.

EXAMPLE II

A. Preparation of a high moisture content yellow cake

Several high moisture containing yellow cakes were prepared and the icing prepared in Example I was applied thereto. In preparing the high moisture cake 496 grams of cake mix containing on a weight basis about 15% emulsified shortening, 38.5% flour, 38.5% sugar, 2.50% flavoring and coloring agents and 2.50% chemical leavening and 3% non-fat milk solid was reconstituted with 110 grams of egg and 315 grams of oil. A batter was prepared from reconstituted cake mix by blending its ingredients in a 3-quart mixing bowl at low speed for three minutes followed by beating at a medium speed for an additional two minutes. The baters were then transferred to a 13" x 9" pan and baked at 375° F. for about 35 minutes. The resultant cakes were allowed to cool under ambient conditions. Average total moisture content as ascertained by the Toulene distillation method for moisture determination as published by the American Dry Milk Institute, Inc., Bulletin 911 (1948) was 40.1 percent by weight.

B. Icing stability

For comparative purposes, an icing was prepared in accordance with Example I, however, a low maltose corn syrup having an 80% solid content and containing 31.5% by weight maltose and 37% by weight dextrose (i.e., disaccharide to monosaccharide ratio of 63.74) was employed. Icings prepared in accordance with Example I and that of Example IIB heretofore described were then applied to the high moisture containing cakes prepared via Example IIA. The resultant iced cakes were then placed in identical transparent substantially air-tight cake canisters. It was observed that the novel icings of the present invention retained its firm aerated identity without any sign of degradation (e.g., no watery or syrupy development) even after 48 hours of testing. After 16 hours testing the low maltose icing exhibited signs of degradation (e.g., became watery and/or syrupy).

What is claimed is:

1. An icing composition adapted for use in culinary bakery products, said icing comprising a uniform admixture of:
   (I) a sweetening portion having less than 1 part by weight monosaccharide for each 20 parts by weight disaccharide, said sweetening portion comprising:
      (a) 15 parts by weight corn syrup portion having a disaccharide to monosaccharide ratio of at least 3:1; and,
      (b) from 40 to 80 parts by weight of a disaccharide sugar portion substantially free from sugar crystals having a crystal size greater than 50 microns.
   (II) from 7 to 17 parts by weight water portion; and,
   (III) from about 5 to 30 parts by weight emulsified fat portion uniformly dispersed throughout said icing in the form of minute fat globules.

2. The icing according to claim 1 wherein the disaccharide sugar portion provides from about 55 to about 66 parts by weight disaccharide and the amount of fat ranges from about 8 to about 20 parts by weight.

3. The icing composition according to claim 2 wherein the disaccharide sugar provided by the disaccharide sugar portion is sucrose and the amount of water in the water portion ranges from about 9 to about 13 parts by weight.

4. The icing composition according to claim 3 wherein the fat has a Wiley melting point ranging from about 95° F. to about 130° F.

5. The icing according to claim 4 wherein the corn syrup portion has a disaccharide to monosaccharide ratio of at least 5:1 and the disaccharide and monosaccharide contents thereof consist essentially of maltose and dextrose.

6. An icing composition according to claim 5 wherein the icing composition is an aerated icing containing on a volume basis from about 10 to about 75 percent ingested gas, said ingested gas containing less than 1.5 percent by weight molecular oxygen and having a specific gravity of less than about 1.2.

7. The aerated icing composition according to claim 6 wherein the icing composition consists essentially of the following ingredients:
   (I) a sweetening portion having less than 1 part by weight monosaccharide for each 40 parts by weight disaccharide comprising:
      (a) 15 parts by weight corn syrup; and,
      (b) about 62 parts by weight sucrose.
   (II) a water portion in an amount ranging from about 10 to about 12 parts by weight.
   (III) from about 10 to about 15 parts by weight fat having a Wiley melting point ranging from about 110° F. to about 125° F.

8. The aerated icing according to claim 7 containing a hydrophilic surface active agent in an amount ranging from about 0.05 to 2 parts by weight and a lipophilic emulsifier in an amount ranging from at least 1 to about 10 percent by weight of the total fat contained in said icing.

9. The aerated icing according to claim 8 wherein the edible gas is nitrogen and the amount of molecular oxygen is less than 1 percent of the total nitrogen weight.

10. The aerated icing according to claim 9 wherein the hydrophilic surface active agent is polyoxyethylene sorbitan monostearate, the lipophilic emulsifier is glycerol monostearate.

References Cited

UNITED STATES PATENTS

| | | | |
|---|---|---|---|
| 2,822,303 | 2/1958 | Campbell et al. | 99—142 |
| 3,194,666 | 7/1965 | Bedenk et al. | 99—139 |

MAURICE W. GREENSTEIN, Primary Examiner

J. M. HUNTER, Assistant Examiner